(12) United States Patent
Tabuchi et al.

(10) Patent No.: US 11,133,677 B2
(45) Date of Patent: Sep. 28, 2021

(54) POWER CONTROLLER, POWER CONTROL METHOD, AND PROGRAM FOR CONTROLLING POWER

(71) Applicant: Panasonic Intellectual Property Management Co., Ltd., Osaka (JP)

(72) Inventors: Takayuki Tabuchi, Osaka (JP); Sen'ichi Onoda, Osaka (JP); Ko Ishibashi, Osaka (JP); Shoichi Toya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/958,648

(22) PCT Filed: Dec. 14, 2018

(86) PCT No.: PCT/JP2018/046183
§ 371 (c)(1),
(2) Date: Jun. 26, 2020

(87) PCT Pub. No.: WO2019/131227
PCT Pub. Date: Jul. 4, 2019

(65) Prior Publication Data
US 2020/0373760 A1 Nov. 26, 2020

(30) Foreign Application Priority Data
Dec. 26, 2017 (JP) .............................. JP2017-250052

(51) Int. Cl.
*H02J 3/32* (2006.01)
*H02J 3/38* (2006.01)
(Continued)

(52) U.S. Cl.
CPC ................ *H02J 3/32* (2013.01); *H02J 3/381* (2013.01); *H02J 7/0013* (2013.01); *H02J 7/35* (2013.01); *H02J 2300/26* (2020.01)

(58) Field of Classification Search
CPC .. H02J 3/32; H02J 3/381; H02J 7/0013; H02J 7/35; H02J 2300/26; H02J 3/38; H02J 7/00
See application file for complete search history.

(56) References Cited

U.S. PATENT DOCUMENTS 9,415,699 B2 8/2016 Morioka et al.
9,849,803 B2 12/2017 Morioka et al.
(Continued)

FOREIGN PATENT DOCUMENTS

EP 2463981 A1 6/2012
JP 2012-210077 A 10/2012
JP 2014-073042 A 4/2014

OTHER PUBLICATIONS

International Search Report issued in corresponding International Patent Application No. PCT/JP2018/046183, dated Mar. 12, 2019, with English translation.
(Continued)

*Primary Examiner* — Robert L Deberadinis
(74) *Attorney, Agent, or Firm* — McDermott Will & Emery LLP (57) ABSTRACT

A recognition interface recognizes a reverse flow state in which power flows from a customer's site to a power system or a forward flow state in which power flows from the power system to the customer's site. When the recognition interface recognizes a reverse flow state, a controller causes at least one of a first power storage system through a third power storage system to be charged, based on a priority level related to charge defined for the first power storage system through the third power storage system. When the recogni-
(Continued)

tion interface recognizes a forward flow state, the controller causes at least one of the first power storage system through the third power storage system 40c to be discharged, based on a priority level related to discharge defined for the first power storage system 40a through the third power storage system.

13 Claims, 4 Drawing Sheets

(51) Int. Cl.
*H02J 7/00* (2006.01)
*H02J 7/35* (2006.01)

(56) References Cited

U.S. PATENT DOCUMENTS

| 2012/0133333 | A1 | 5/2012 | Morioka et al. |
| 2015/0314701 | A1 | 11/2015 | Morioka et al. |
| 2018/0241210 | A1 | 8/2018 | Terai et al. |
| 2019/0103756 | A1 | 4/2019 | Hasegawa |

OTHER PUBLICATIONS

Extended European Search Report issued in corresponding European Patent Application No. 18894228.8., dated Oct. 7, 2020.

|  | PRIORITY LEVEL (CHARGE) | PRIORITY LEVEL (DISCHARGE) |
|---|---|---|
| FIRST POWER STORAGE SYSTEM | 1 | 3 |
| SECOND POWER STORAGE SYSTEM | 2 | 2 |
| THIRD POWER STORAGE SYSTEM | 3 | 1 |

# POWER CONTROLLER, POWER CONTROL METHOD, AND PROGRAM FOR CONTROLLING POWER

CROSS-REFERENCE TO RELATED APPLICATIONS

This application is the U.S. National Phase under 35 U.S.C. § 371 of International Application No. PCT/JP2018/046183, filed on Dec. 14, 2018, which claims the benefit of priority from the prior Japanese Patent Application No. 2017-250052, filed on Dec. 26, 2017, the entire contents of which are incorporated herein by reference.

BACKGROUND ART

1. Field

The present disclosure relates to power controllers, power control methods, and recording mediums for controlling power.

2. Description of the Related Art

In a power system, a power storage system may be combined with a photovoltaic power generation system. The clean mode set in a power system suppresses power purchase from a commercial system interconnected with the power system and provides power consumed in the load by generating power in the photovoltaic power generation system and discharging power from the power storage system (see, for example, JP2014-73042).

In the case the capacity of a power storage system is small, a plurality of power storage systems are combined for use. To charge or discharge a plurality of power storage systems, it is more preferable to control the systems collectively than to control the systems independently.

SUMMARY

The disclosure addresses the above-described issue, and a general purpose thereof is to provide a technology of controlling a plurality of power storage systems.

A power controller according to an embodiment of the present disclosure is a power controller installed at a customer's site and adapted to control charge and discharge of a plurality of power storage systems connected to a power system, including: a recognition interface that recognizes a reverse flow state in which power flows from the customer's site to the power system or a forward flow state in which power flows from the power system to the customer's site; and a controller that, when the recognition interface recognizes a reverse flow state, causes at least one of the plurality of power storage systems to be charged, based on a priority level related to charge defined for the plurality of power storage systems. When the recognition interface recognizes a forward flow state, the controller causes at least one of the plurality of power storage systems to be discharged, based on a priority level related to discharge defined for the plurality of power storage systems.

Another embodiment of the present disclosure relates to a power control method. The method is a power control method adapted for a power controller installed at a customer's site and adapted to control charge and discharge of a plurality of power storage systems connected to a power system, the method including: recognizing a reverse flow state in which power flows from the customer's site to the power system or a forward flow state in which power flows from the power system to the customer's site; when a reverse flow state is recognized, causing at least one of the plurality of power storage systems to be charged, based on a priority level related to charge defined for the plurality of power storage systems; and when a forward flow state is recognized, causing at least one of the plurality of power storage systems to be discharged, based on a priority level related to discharge defined for the plurality of power storage systems.

Optional combinations of the aforementioned constituting elements, and implementations of the present disclosure in the form of methods, systems, computer programs, recording mediums recording computer programs, etc. may also be practiced as additional modes of the present disclosure.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

The invention will now be described by reference to the preferred embodiments. This does not intend to limit the scope of the present invention, but to exemplify the invention.

Embodiment 1

A summary will be given before describing the embodiment of the present disclosure in specific details. The embodiment relates to a plurality of power storage systems connected to a power system at a customer's site. A customer' site is a facility that receives a supply of power from an electric utility company, etc. and is exemplified by a residence, an office, a shop, a factory, a park, etc. A solar cell system is also installed at a customer's site, and the solar cell system is connected to the power system and the plurality of power storage systems. If the sales price of power generated in the solar cell system is high, the power may be sold by causing the power generated in the solar cell system to flow reversely to the power system. If the sales price of power generated in the solar cell system is low, it is more preferable to supply the power to the load installed at the customer's site than selling the power generated in the solar cell system. In this embodiment, the latter case is assumed.

It is preferred that power generated in the solar cell system and not consumed in the load be used to charge the power storage system. The power storage system supplies power to the load at a point of time when the solar cell system is not generating power or at a point of time when the power generated in the solar cell system is insufficient. If the capacity of the power storage system is large, a single power storage system may be installed at the customer's site. In this embodiment, the capacity of the power storage system is not so large so that a plurality of power storage systems are installed at the customer's site. In the case a plurality of power storage systems are installed, wasteful control may be performed if the power storage systems control charge and discharge individually. Therefore, it is hoped that charge and discharge of the plurality of power storage systems be controlled collectively.

In this embodiment, one of the plurality of power storage systems is defined as a master power storage system, and the other are defined as slave power storage systems. The master power storage system defines a priority level related to charge and a priority level related to discharge for each of the plurality of power storage systems. The master power storage system determines whether the situation requires that the plurality of power storage systems be charged or discharged. When the situation requires that the systems be charged, the master power storage system selects a power storage system that should be charged based on the priority level related to charge and instructs the selected power storage system to charge the battery. The power storage system thus instructed performs a charging process. When the situation requires that the systems be discharged, on the other hand, the master power storage system performs an associated process based on the priority level related to discharge.

Figure 1:
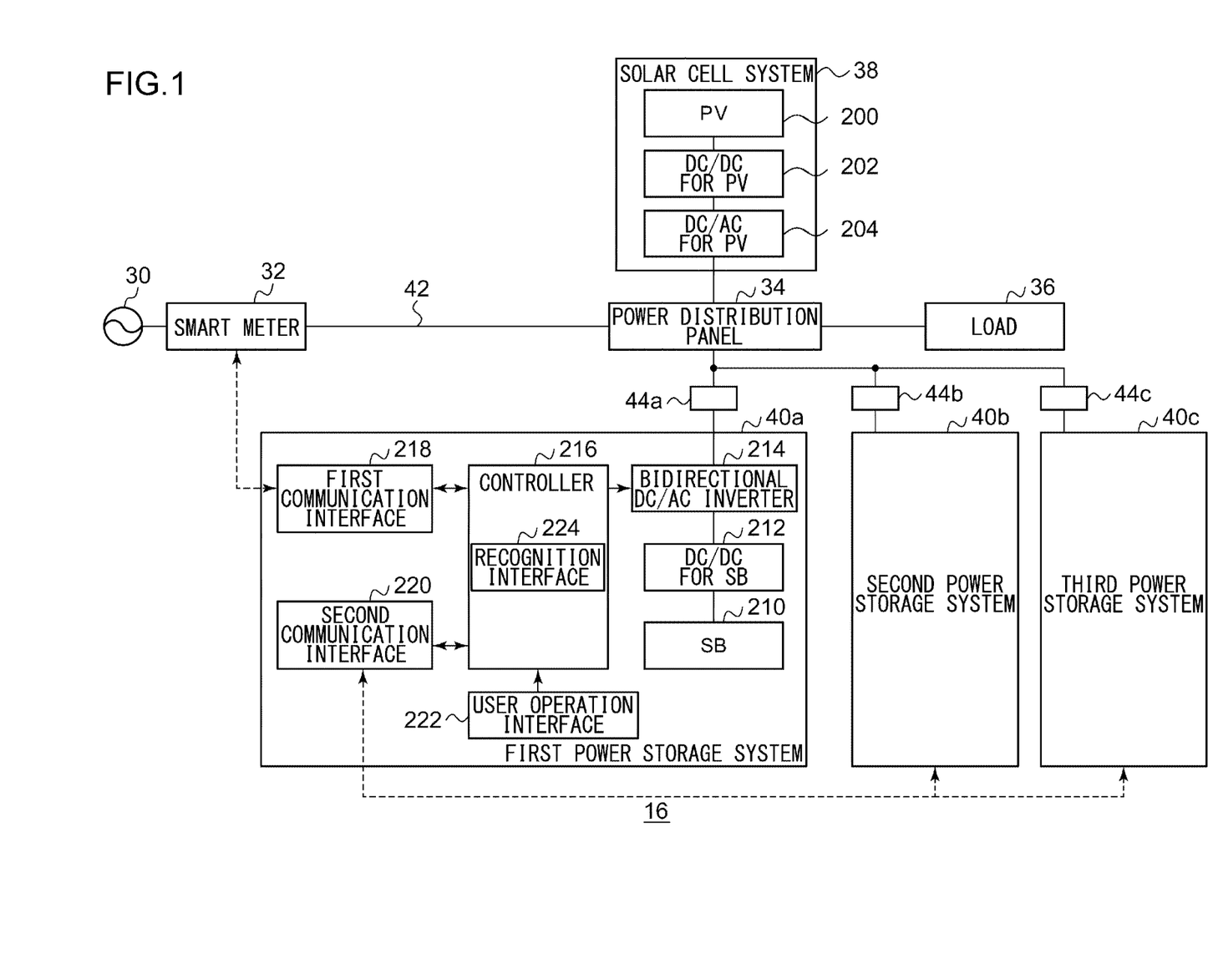
FIG. 1 shows a configuration of a customer's site according to embodiment 1.

FIG. 1 shows a configuration of a customer's site 16. Installed at the customer's site 16 are a power system 30, a smart meter 32. a power distribution panel 34, a load 36, a solar cell system 38, a first power storage system 40a, a second power storage system 40b, a third power storage system 40c, which are generically referred to as power storage systems 40, a first electric outlet 44a, a second electric outlet 44b, a third electric outlet 44c, which are generically referred to as electric outlets 44. The solar cell system 38 includes phtovoltaics (PV) 200, a direct current (DC)/DC 202 for the PV, and a DC/alternating current (AC) 204 for the PV. The first power storage system 40a includes a storage battery (SB) 210, a DC/DC 212 for the SB, a bidirectional DC/AC inverter 214, a controller 216, a first communication interface 218, a second communication interface 220, a user operation interface 222. The controller 216 includes a recognition interface 224. The second power storage system 40b and the third power storage system 40c are configured in a manner similar to the first power storage system 40a.

The first power storage system 40a and the power distribution panel 34 are connected via the first electric outlet 44a, the second power storage system 40b and the power distribution panel 34 are connected via the second electric outlet 44b, and the third power storage system 40c and the power distribution panel 34 are connected via the third electric outlet 44c. In other words, the power storage systems 40 are configured to be detachable from the power distribution panel 34 at the electric outlets 44. Therefore, installation of an additional power storage system 40 at the customer's site 16 only requires connecting the new power storage system 40 to the electric outlet 44. The number of power storage systems 40 and electric outlets 44 is not limited to "3". A heat pump hot water supplier, etc. may be installed at the customer's site 16, but those are omitted from the description.

The customer's site 16 is exemplified by an independent residence, a complex housing such as a condominium, a shop such as a convenience store or a supermarket, a commercial facility such as a building, and a factory. As mentioned above, the customer's site 16 is a facility that receives a supply of power from an electric utility company, etc. The power system 30 is provided by an electric power provider, etc. The smart meter 32 is a digital electric energy meter connected to the power system 30. The smart meter 32 can measure the forward flow electric energy incoming from the power system 30 and the reverse flow electric energy going out to the power system 30. The smart meter 32 has a communication function and can communicate with the first power storage system 40a. The smart meter 32 transmits a result of measurement, i.e., the forward flow electric energy or the reverse flow electric energy to the first power storage system 40a.

An electricity distribution line 42 connects the smart meter 32 and the power distribution panel 34. The power distribution panel 34 is connected to the smart meter 32 and is connected to the power system 30 via the smart meter 32. Also, the power distribution panel 34 is connected to the load 36 and supplies power to the load 36. The load 36 is a device that consumes power supplied from the power distribution panel 34. The load 36 encompasses devices such as an air conditioner, a television set, a light device, and a refrigerator. The figure shows one load 36 connected to the power distribution panel 34, but a plurality of loads 36 may be connected to the power distribution panel 34.

A PV 200 is a solar cell and a reusable energy power generator. The PV 200 uses photovoltaic effect to convert light energy into electric power directly. A silicon solar cell, a solar cell made of a compound semiconductor, etc., a dye-sensitized solar cell (organic solar cell) or the like is used as the solar cell. The PV 200 is connected to the DC/DC 202 for the PV and outputs the generated DC power to the DC/DC 202 for the PV.

The DC/DC 202 for the PV is a DC-DC converter that converts the DC power output from the PV 200 into a DC power of a desired voltage value and outputs the resultant DC power to the DC/AC 204 for the PV. The DC/DC 202 for the PV is comprised of, for example, a boost chopper. The DC/DC 202 for the PV is subject to maximum power point tracking (MPPT) control to maximize the output power of the PV 200. The DC/AC 204 for the PV is a DC-AC inverter and outputs that converts the DC power output from the DC/DC 202 for the PV into an AC power and outputs the AC power to the electricity distribution line 42. The PV 200, the DC/DC 202 for the PV, and the DC/AC 204 for the PV may be integrated with each other. In that case, the unit will still be called the solar cell system 38.

The SB 210 in the first power storage system 40a is a storage battery that can be electrically charged or discharged and is exemplified by a lithium ion battery, a nickel hydride storage battery, a lead storage battery, an electric double layer capacitor, a lithium ion capacitor, or the like. The SB 210 is connected to the DC/DC 212 for the SB. The DC/DC 212 for the SB is a DC-DC converter that performs conversion between the DC power on the side of the SB 210 and the DC power on the side of the bidirectional DC/AC inverter 214.

The bidirectional DC/AC inverter 214 is connected between the DC/DC 212 for the SB and the power distribution panel 34. The bidirectional DC/AC inverter 214 converts the AC power from the power distribution panel 34 into a DC power and outputs the resultant DC power to the DC/DC 212 for the SB. The bidirectional DC/AC inverter 214 also converts the DC power from the DC/DC 212 for the SB into an AC power and outputs the resultant AC power to the power distribution panel 34. In other words, the bidirectional DC/AC inverter 214 charges and discharges the SB 210. Control of the bidirectional DC/AC inverter 214 is exercised by the controller 216.

The controller 216 is connected to the first communication interface 218 and the second communication interface 220. The first communication interface 218 communicates with the smart meter 32, and the second communication interface 220 performs communication with the other power storage systems 40. For communication in the first communication interface 218 and the second communication interface 220, wire communication or wireless communication is used. In the case the first communication interface 218 and the second communication interface 220 are configured for a common scheme, the first communication interface 218 and the second communication interface 220 may be integrated. The SB 210, the DC/DC 212 for the SB, the bidirectional DC/AC inverter 214, the controller 216, the first communication interface 218, and the second communication interface 220 may be stored in one housing. In that case, the unit will still be called the power storage system 40. As described above, the second power storage system 40b and the third power storage system 40c are configured in a manner similar to the first power storage system 40a.

The user operation interface 222 of the first power storage system 40a is a user-controllable interface. For example, the user operation interface 222 is comprised of a button. The user uses the user operation interface 222 to cause the controller 216 to define the first power storage system 40a as the master. The first power storage system 40a defined as the master controls charge and discharge of the plurality of power storage systems 40 and so can be said to be a power controller. The second power storage system 40b and the third power storage system 40c are also provided with the user operation interface 222. The user uses the user operation interface 222 to define both the second power storage system 40b and the third power storage system 40c as the slave.

The first communication interface 218 of the first power storage system 40a receives the forward flow electric energy or the reverse flow electric energy from the smart meter 32. The first communication interface 218 outputs the forward flow electric energy or the reverse electric energy to the recognition interface 224. When the reverse flow electric energy is larger than a threshold value (hereinafter, "first threshold value"), the recognition interface 224 recognizes a reverse flow state in which power flows from the customer's site 16 to the power system 30. When the reverse flow electric energy is equal to or smaller than the first threshold value, the recognition interface 224 recognizes that the system is not in a reverse flow state. When the forward flow electric energy is larger than a threshold value (hereinafter, "second threshold value"), the recognition interface 224 recognizes a forward flow state in which power flows from the power system 30 to the customer's site 16. When the forward flow electric energy is equal to or smaller than the second threshold value, the recognition interface 224 recognizes that the system is not in a forward flow state.

Figure 2:
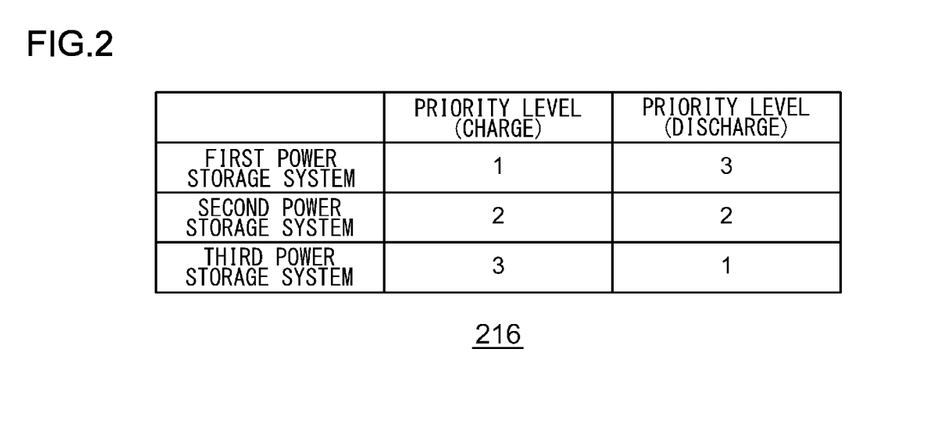
FIG. 2 shows a table stored in the controller of FIG. 1.

When the recognition interface 224 recognizes that the system is in a reverse flow state, the controller 216 causes at least one of the plurality of power storage systems 40 to be charged based on the priority level related to charge defined for the plurality of power storage systems 40. FIG. 2 shows a table stored in the controller 216. The priority level related to charge is indicated as priority level (charge), and the priority level is assigned to each of the first power storage system 40a through the third power storage system 40c. The priority level "1" means the highest priority level, followed by the priority levels "2", "3", . . . . Reference is made back to FIG. 1.

The controller 216 instructs the power storage system 40 with the priority level "1" to charge the battery. When the recognition interface 224 recognizes a reverse flow state after an elapse of a predefined period of time since the instruction, the controller 216 instructs the power storage system 40 with the priority level "2" to charge the battery. Further, when the recognition interface 224 recognizes a reverse flow state after an elapse of a predefined period of time since the instruction, the controller 216 instructs the power storage system 40 with the priority level "3" to charge the battery. Such steps are continued until the recognition interface 224 no longer recognizes a reverse flow state.

When the power storage system 40 selected according to the priority level is the first power storage system 40a, the controller 216 directs the bidirectional DC/AC inverter 214 to perform a charging process. When the power storage system 40 selected according to the priority level is the power storage system 40 other than the first power storage system 40a, the controller 216 generates an instruction signal to instruct the selected power storage system 40 to charge the battery and outputs the instruction signal to the second communication interface 220. The second communication interface 220 transmits the instruction signal to the selected power storage system 40. The second communication interface 220 of the selected power storage system 40 receives the instruction signal from the first power storage system 40a. The controller 216 of the selected power storage system 40 directs the bidirectional DC/AC inverter 214 to perform a charging process.

When the recognition interface 224 recognizes that the system is in a forward flow state, the controller 216 of the first power storage system 40a causes at least one of the plurality of power storage systems 40 to be discharged based on the priority level related to discharge defined for the plurality of power storage systems 40. The priority level related to discharge is indicated as priority level (discharge) in FIG. 2, and the priority level is assigned to each of the first power storage system 40a through the third power storage system 40c. In this case, too, the priority level "1" means the highest priority level, followed by the priority levels "2", "3", . . . . The priority level related to charge and the priority level related to discharge are different. Reference is made back to FIG. 1.

The controller 216 instructs the power storage system 40 with the priority level "1" to discharge the battery. When the recognition interface 224 recognizes a forward flow state after an elapse of a predefined period of time since the instruction, the controller 216 instructs the power storage system 40 with the priority level "2" to discharge the battery. Further, when the recognition interface recognizes a forward flow state after an elapse of a predefined period of time since the instruction, the controller 216 instructs the power storage system 40 with the priority level "3" to discharge the battery. Such steps are continued until the recognition interface 224 no longer recognizes a forward flow state. The instruction to direct the selected power storage system 40 to discharge battery may be given as in the case of charge, and a description thereof will be omitted. As described above, the controller 216 of the first power storage system 40a controls charge and discharge of the plurality of power storage systems 40 installed at the customer's site 16 and connected to the power system 30.

Hereinafter, the process of generating a priority level related to charge will be described in the order from (1-1) to (1-4) before describing the process of generating a priority level related to discharge in the order (2-1) through (2-4).
(1-1) Process of Generating a Priority Level Related to Charge (Pattern 1)

The user uses the user operation interface 222 of the first power storage system 40a to input a priority level for each power storage system 40 that is related to charge. By receiving the user operation in the user operation interface 222, the controller 216 receives the priority level for each power storage system 40 that is related to charge. The controller 216 stores the priority level related to charge as shown in the table of FIG. 2. The priority level related to charge may be designated such that the level changes between time zones. The controller 216 causes at least one of the plurality of power storage systems 40 to be charged based on the priority level related to charge.

(1-2) Process of Generating a Priority Level Related to Charge (Pattern 2)

The recognition interface 224 of the first power storage system 40*a* recognizes the amount in which the SB 210 can be charged. A publicly known technology may be used for this process, and a description thereof will be omitted. Further, the second communication interface 220 of the first power storage system 40*a* communicates with the other power storage systems 40 to receive information related to the amount in which the SB 210 of each of the other power storage systems 40 can be charged. The second communication interface 220 outputs the received information to the recognition interface 224, and the recognition interface 224 recognizes the amount in which the SB 210 of each of the other power storage systems 40 can be charged. Consequently, the recognition interface 224 recognizes the amount in which each of the plurality of power storage systems 40 can be charged. The controller 216 generates a priority level related to charge for each of the plurality of power storage systems 40 such that the larger the amount in which the system can be charged as recognized by the recognition interface 224, the higher the priority level. Such steps are performed periodically, and the priority level related to charge may change accordingly.

(1-3) Process of Generating a Priority Level Related to Charge (Pattern 3)

The recognition interface 224 of the first power storage system 40*a* recognizes the amount discharged in the SB 210. The amount discharged may be, for example, the amount discharged on the previous data. Further, the second communication interface 220 of the first power storage system 40*a* communicates with the other power storage systems 40 to receive information related to the amount discharged in the SB 210 of each of the other power storage systems 40. The second communication interface 220 outputs the received information to the recognition interface 224, and the recognition interface 224 recognizes the amount discharged in the SB 210 of each of the other power storage systems 40. Consequently, the recognition interface 224 recognizes the amount discharged in each of the plurality of power storage systems 40. The controller 216 generates a priority level related to charge for each of the plurality of power storage systems 40 such that the larger the amount discharged as recognized by the recognition interface 224, the higher the priority level. Such steps are performed periodically, and the priority level related to discharge may change accordingly.

(1-4) Process of Generating a Priority Level Related to Charge (Pattern 4)

When the first power storage system 40*a* is installed at the customer's site 16, the user uses the user operation interface 222 to input the date of installation. By receiving the user operation in the user operation interface 222, the controller 216 receives the date on which the first power storage system 40*a* is installed. Such a step is also performed in the other power storage systems 40. Further, the second communication interface 220 of the first power storage system 40*a* communicates with the other power storage systems 40 to receive information related to the date on which each of the other power storage systems 40 is installed. The second communication interface 220 outputs the received information to the controller 216, and the controller 216 acquires the date of installation of each of the other power storage systems 40. The controller 216 generates a priority level related to charge for each of the plurality of power storage systems 40 based on the date of installation at the customer's site 16. For example, the earlier the date of installation at the customer's site 16, the higher is the priority level assigned. Alternatively, the later the date of installation at the customer's site 16, the higher may be the priority level assigned. The priority level as described is updated every time the new power storage system 40 is installed at the customer's site 16.

(2-1) Process of Generating a Priority Level Related to Discharge (Pattern 1)

The user uses the user operation interface 222 of the first power storage system 40*a* to input a priority level for each power storage system 40 that is related to discharge. By receiving the user operation in the user operation interface 222, the controller 216 receives the priority level for each power storage system 40 that is related to discharge. The controller 216 stores the priority level related to discharge as shown in the table of FIG. 2. The priority level related to discharge may be designated such that the level changes between time zones. The controller 216 causes at least one of the plurality of power storage systems 40 to be discharged based on the priority level related to discharge.

(2-2) Process of Generating a Priority Level Related to Discharge (Pattern 2)

The recognition interface 224 of the first power storage system 40*a* recognizes the amount in which the SB 210 can be discharged. A publicly known technology may be used for this process, and a description thereof will be omitted. Further, the second communication interface 220 of the first power storage system 40*a* communicates with the other power storage systems 40 to receive information related to the amount in which the SB 210 of each of the other power storage systems 40 can be discharged. The second communication interface 220 outputs the received information to the recognition interface 224, and the recognition interface 224 recognizes the amount in which the SB 210 of each of the other power storage systems 40 can be discharged. Consequently, the recognition interface 224 recognizes the amount in which each of the plurality of power storage systems 40 can be discharged. The controller 216 generates a priority level related to discharge for each of the plurality of power storage systems 40 such that the larger the amount in which the system can be discharged as recognized by the recognition interface 224, the higher the priority level. Such steps are performed periodically, and the priority level related to discharge may change accordingly.

(2-3) Process of Generating a Priority Level Related to Discharge (Pattern 3)

The recognition interface 224 of the first power storage system 40*a* recognizes the amount charged in the SB 210. The amount charged may be, for example, the amount charged on the previous data. Further, the second communication interface 220 of the first power storage system 40*a* communicates with the other power storage systems 40 to receive information related to the amount charged in the SB 210 of each of the other power storage systems 40. The second communication interface 220 outputs the received information to the recognition interface 224, and the recognition interface 224 recognizes the amount charged in the SB 210 of each of the other power storage systems 40. Consequently, the recognition interface 224 recognizes the amount charged in each of the plurality of power storage systems 40. The controller 216 generates a priority level related to discharge for each of the plurality of power storage systems 40 such that the larger the amount charged as recognized by the recognition interface 224, the higher the priority level. Such steps are performed periodically, and the priority level related to discharge may change accordingly.

(2-4) Process of Generating a Priority Level Related to Discharge (Pattern 4)

When the first power storage system 40a is installed at the customer's site 16, the user uses the user operation interface 222 to input the date of installation. By receiving the user operation in the user operation interface 222, the controller 216 receives the date on which the first power storage system 40a is installed. Such a step is also performed in the other power storage systems 40. Further, the second communication interface 220 of the first power storage system 40a communicates with the other power storage systems 40 to receive information related to the date on which each of the other power storage systems 40 is installed. The second communication interface 220 outputs the received information to the controller 216, and the controller 216 acquires the date of installation of each of the other power storage systems 40. The controller 216 generates a priority level related to discharge for each of the plurality of power storage systems 40 based on the date of installation at the customer's site 16. For example, the earlier the date of installation at the customer's site 16, the higher is the priority level assigned. Alternatively, the later the date of installation at the customer's site 16, the higher may be the priority level assigned. The priority level as described is updated every time the new power storage system 40 is installed at the customer's site 16.

The device, the system, or the entity that executes the method according to the disclosure is provided with a computer. By causing the computer to run a program, the function of the device, the system, or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The plurality of electronic circuits may be integrated in one chip or provided in a plurality of chips. The plurality of chips may be aggregated in one device or provided in a plurality of devices. The program is recorded in a non-transitory recording medium such as a computer-readable ROM, optical disk, and hard disk drive. The program may be stored in a recording medium in advance or supplied to a recording medium via wide area communication network including the Internet.

Figure 3:
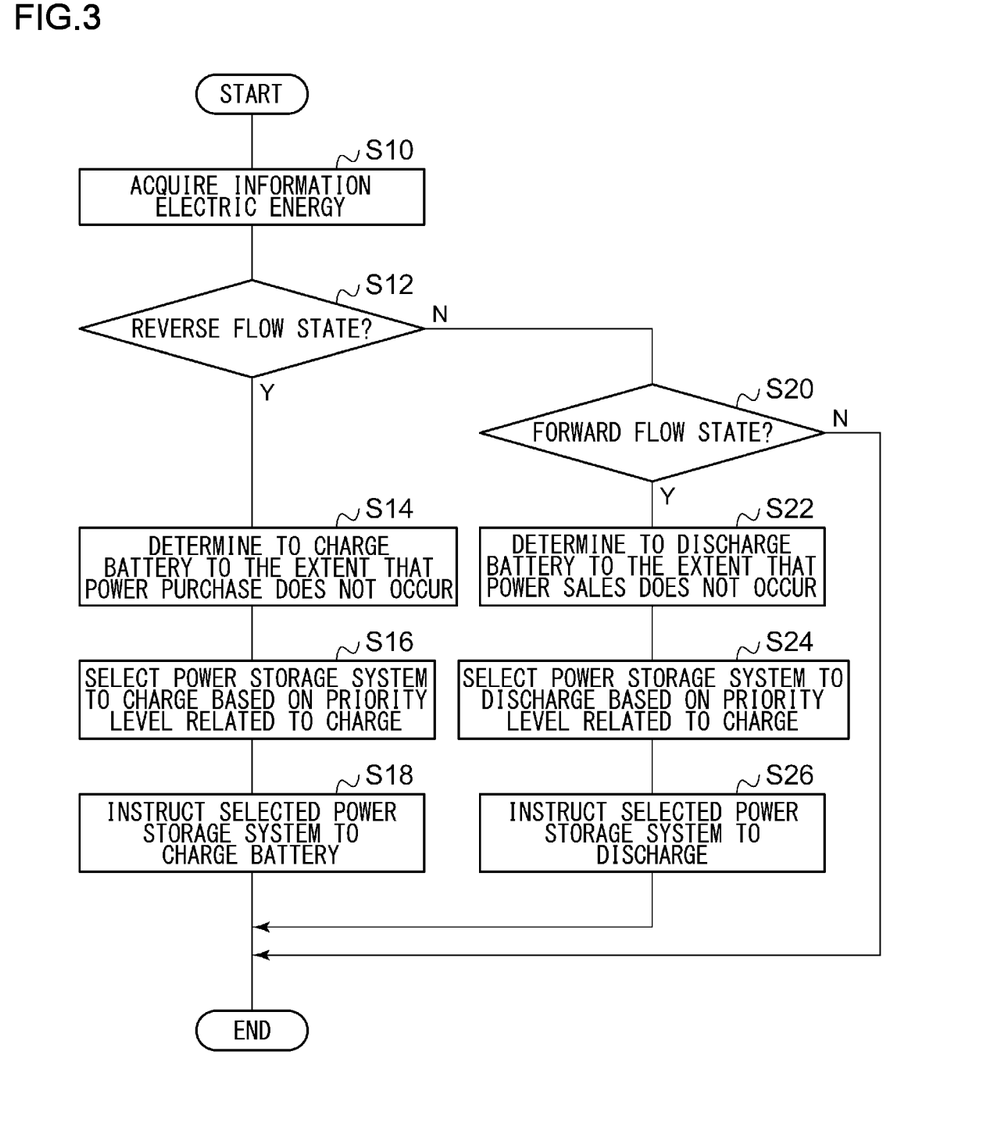
FIG. 3 is a flowchart showing the steps of control in the first power storage system of FIG. 1.

A description will be given of the operation of the power storage system 40 having the configuration described above. FIG. 3 is a flowchart showing the steps of control in the first power storage system 40a. The first communication interface 218 of the first power storage system 40a acquires information on electric energy (S10). When it is determined based on the information on electric energy that a reverse flow state is occurring (Y in S12), the controller 216 determines to charge the battery to the extent that power purchase does not occur (S14). The controller 216 selects the power storage system 40 that should be charged based on the priority level related to charge (S16). The controller 216 instructs the selected power storage system 40 to charge the battery (S18). When it is determined based on the information on electric energy that a reverse flow state is not occurring (N in S12) and that a forward flow state is occurring (Y in S20), the controller 216 determines to discharge the battery to the extent that power sales does not occur (S22). The controller 216 selects the power storage system 40 that should be discharged based on the priority level related to discharge (S24). The controller 216 instructs the selected power storage system 40 to discharge the battery (S26). When it is determined based on the information on electric energy that a forward flow state is not occurring (N in S20), the process is terminated.

According to this embodiment, at least one of the plurality of power storage systems 40 is caused to be charged in a reverse flow state, based on the priority level related to charge, and at least one of the plurality of power storage systems 40 is caused to be discharged in a forward flow state, based on the priority level related to discharge. Accordingly, the plurality of power storage systems 40 can be controlled. Further, the plurality of power storage systems 40 are controlled collectively so that the efficiency of charge of discharge is improved. Further, the priority level related to charge and the priority level related to discharge are different so that the priority levels suited to charge and discharge can be set.

Further, the priority level related to charge is set based on the priority level related to charge input by the user so that the priority level suited to the user's intent is set. The priority level related to charge may be generated for each of the plurality of power storage systems 40 such that the larger the amount in which each of the plurality of power storage systems 40 can be charged, the higher the priority level, so that the number of power storage systems 40 charged is reduced. The priority level related to charge may be generated for each of the plurality of power storage systems 40 such that the larger the amount discharged in each of the plurality of power storage systems 40, the higher the priority level, so that the number of power storage systems 40 charged is reduced. The priority level related to charge may be generated for each of the plurality of power storage systems 40 such that the earlier the date of installation at the customer's site 16, the higher the priority level, so that power storage system 40 installed first is preferentially charged. The priority level related to charge may be generated for each of the plurality of power storage systems 40 such that the later the date of installation at the customer's site 16, the higher the priority level, so that power storage system 40 installed newly is preferentially charged.

The priority level related to discharge is set based on the priority level related to discharge input by the user so that the priority level suited to the user's intent is set. The priority level related to discharge may be generated for each of the plurality of power storage systems 40 such that the larger the amount in which each of the plurality of power storage systems 40 can be discharged, the higher the priority level, so that the number of power storage systems 40 discharged is reduced. The priority level related to discharge may be generated for each of the plurality of power storage systems 40 such that the larger the amount charged in each of the plurality of power storage systems 40, the higher the priority level, so that the number of power storage systems 40 discharged is reduced. The priority level related to discharge may be generated for each of the plurality of power storage systems 40 such that the earlier the date of installation at the customer's site 16, the higher the priority level, so that power storage system 40 installed first is preferentially charged. The priority level related to discharge may be generated for each of the plurality of power storage systems 40 such that the later the date of installation at the customer's site 16, the higher the priority level, so that power storage system 40 installed newly is preferentially charged.

A summary of an embodiment of the present disclosure is given below. A first power storage system 40a according to an embodiment of the present disclosure is the first power storage system 40a installed at a customer's site 16 and adapted to charge and discharge of a plurality of power storage systems connected to a power system, comprising: a recognition interface 224 that recognizes a reverse flow state in which power flows from the customer's site 16 to the power system 30 or a forward flow state in which power flows from the power system 30 to the customer's site 16; and a controller 216 that, when the recognition interface 224 recognizes a reverse flow state, causes at least one of the plurality of power storage systems 40 to be charged, based on a priority level related to charge defined for the plurality of power storage systems 40. When the recognition interface 224 recognizes a forward flow state, the controller 216 causes at least one of the plurality of power storage systems 40 to be discharged, based on a priority level related to discharge defined for the plurality of power storage systems 40.

The priority level related to charge and the priority level related to discharge in the controller are equal.

The priority level related to charge and the priority level related to discharge in the controller are different.

The first power storage system 40a may further include a user operation interface 222 configured to be user-controllable. The controller causes at least one of the plurality of power storage systems 40 to be charged, based on the priority level related to charge input from the user operation interface 222.

The recognition interface 224 recognizes an amount in which each of the plurality of power storage systems 40 can be charged, and the controller 216 generates the priority level related to charge for each of the plurality of power storage systems 40 such that the larger the amount in which the system can be charged as recognized by the recognition interface 224, the higher the priority level.

The recognition interface 224 recognizes an amount discharged in each of the plurality of power storage systems 40, and the controller 216 generates the priority level related to charge for each of the plurality of power storage systems 40 such that the larger the amount discharged as recognized by the recognition interface 224, the higher the priority level.

The controller 216 generates the priority level related to charge for each of the plurality of power storage systems 40 based on a date of installation at the customer's site 16.

The first power storage system 40a may further include a user operation interface 222 configured to be user-controllable. The controller 216 causes at least one of the plurality of power storage systems 40 to be discharged, based on the priority level related to discharge input from the user operation interface 222.

The recognition interface 224 recognizes an amount in which each of the plurality of power storage systems 40 can be discharged, and the controller 216 generates the priority level related to discharge for each of the plurality of power storage systems 40 such that the larger the amount in which the system can be discharged as recognized by the recognition interface 224, the higher the priority level.

The recognition interface 224 recognizes an amount charged in each of the plurality of power storage systems 40, and the controller 216 generates the priority level related to discharge for each of the plurality of power storage systems 40 such that the larger the amount charged as recognized by the recognition interface 224, the higher the priority level.

The controller 216 generates the priority level related to discharge for each of the plurality of power storage systems 40 based on a date of installation at the customer's site 16.

Another embodiment of the present disclosure relates to a power control method. The method is a power control method adapted for a first power storage system 40a installed at a customer's site 16 and adapted to control charge and discharge of a plurality of power storage systems 40 connected to a power system 30, the method comprising: recognizing a reverse flow state in which power flows from the customer's site 16 to the power system 30 or a forward flow state in which power flows from the power system 30 to the customer's site 16; when a reverse flow state is recognized, causing at least one of the plurality of power storage systems 40 to be charged, based on a priority level related to charge defined for the plurality of power storage systems 40; and when a forward flow state is recognized, causing at least one of the plurality of power storage systems 40 to be discharged, based on a priority level related to discharge defined for the plurality of power storage systems 40.

Embodiment 2

A description will now be given of embodiment 2. Like embodiment 1, embodiment 2 relates to a plurality of power storage systems connected to a power system at a customer's site. In embodiment 1, the first power storage system as a power controller controls charge and discharge in the plurality of power storage systems by using the priority level. In embodiment 2, a power management system server is provided aside from the plurality of power storage systems, and the power management system server as a power controller controls charge and discharge in the plurality of power storage systems by using the priority level. The description below highlights a difference from embodiment 1.

Figure 4:
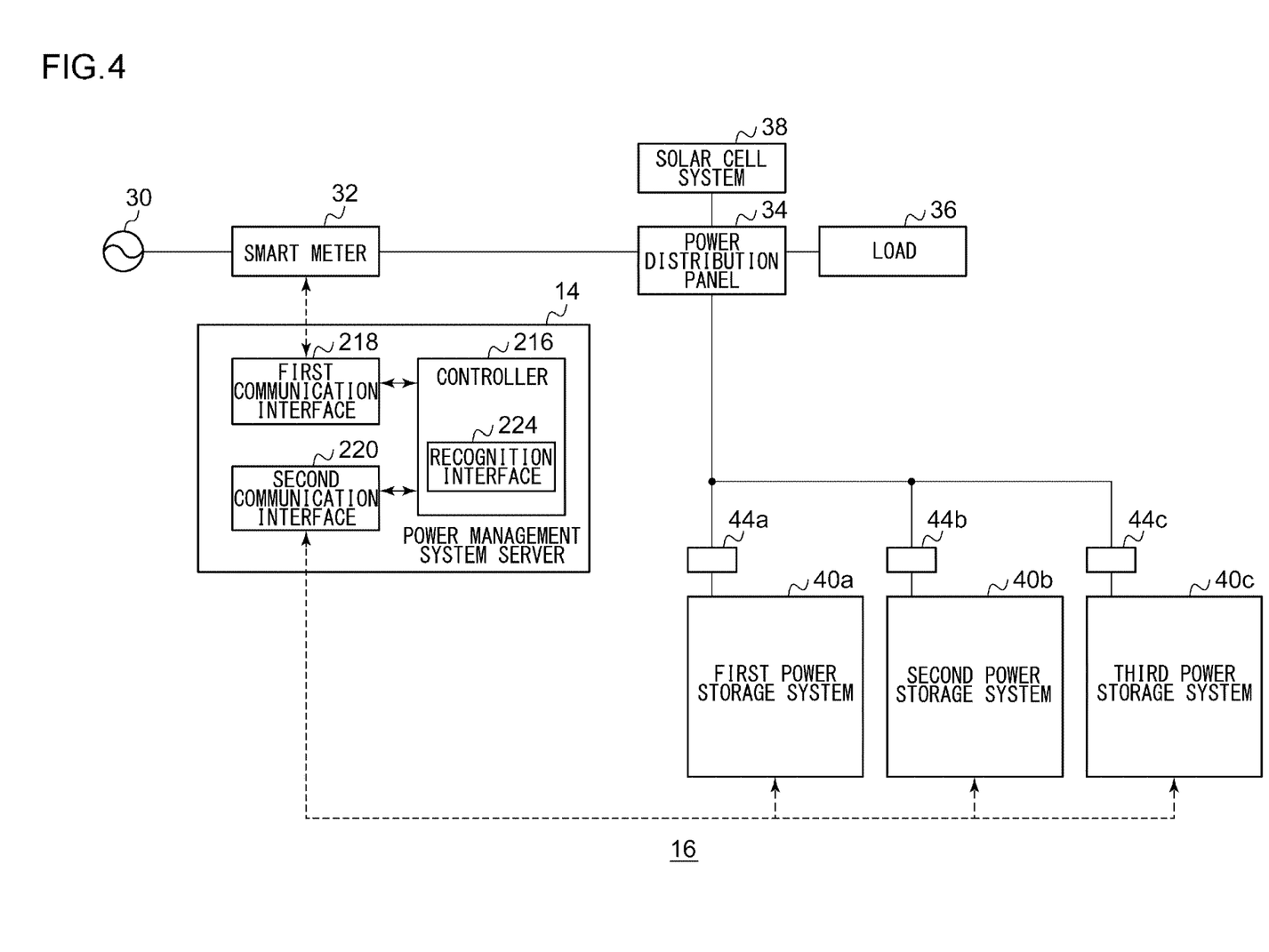
FIG. 4 shows a configuration of the customer's site according to embodiment 2.

FIG. 4 shows a configuration of the customer's site 16. A power management system server 14 is added to the configuration of the customer's site 16 shown in FIG. 1. The power management system server 14 includes the controller 216, the first communication interface 218, and the second communication interface 220. The controller 216 includes the recognition interface 224. The power management system server 14 is a computer for performing a process in a power management system. For example, the power management system server 14 is installed at the customer's site 16. The power management system server 14 has a function of, for example, a home energy management system (HEMS) controller. The controller 216, the first communication interface 218, the second communication interface 220, and the recognition interface 224 in the power management system server 14 perform processes similar to those of the first power storage system 40a of FIG. 1. Therefore, a description of the controller 216, the first communication interface 218, the second communication interface 220, and the recognition interface 224 is omitted. Like the other power storage systems 40, the first power storage system 40a of FIG. 1 is configured as a slave power storage system 40.

According to this embodiment, the power management system server 14 controls charge and discharge in the plurality of power storage systems 40 so that the flexibility of configuration is improved.

Embodiment 3

A description will now be given of embodiment 3. Like embodiment 1, embodiment 3 also relates to a plurality of power storage systems connected to a power system at a customer's site. In the foregoing embodiments, at least one power storage systems 40 is selected based on the priority level related charge to charge the selected power storage system 40, or at least one power storage system 40 is selected based on the priority level related to discharge to discharge the selected power storage system 40. In embodiment 3, on the other hand, the plurality of power storage systems 40 are charged or discharged at the same time. The configuration of the customer's site 16 according to embodiment 3 is of the same type as that of FIG. 1 or FIG. 4. The description below highlights a difference from the foregoing embodiments.

When the recognition interface 224 recognizes that the system is in a reverse flow state, the controller 216 causes each of the plurality of power storage systems 40 to be charged with a power allocated thereto by dividing the reverse flow electric energy according to a predefined proportion. An example of division according to a predefined proportion is equal division. In the case three power storage systems 40 are included as shown in FIG. 1, for example, these are evenly charged. Another example of the predefined proportion is a value determined by the amount in which each of the plurality of power storage systems 40 can be charged. As in the foregoing embodiments, the amount in which each of the plurality of power storage systems 40 can be charged is collected by using the second communication interface 220.

When the recognition interface 224 recognizes that the system is in a forward flow state, the controller 216 causes each of the plurality of power storage systems 40 to be discharged in an amount of electric power allocated thereto by dividing the forward flow electric energy according to a predefined proportion. An example of division according to a predefined proportion is equal division. In the case three power storage systems 40 are included as shown in FIG. 1, for example, these are evenly discharged. Another example of the predefined proportion is a value determined by the amount in which each of the plurality of power storage systems 40 can be discharged. As in the foregoing embodiments, the amount in which each of the plurality of power storage systems 40 can be discharged is collected by using the second communication interface 220.

According to this embodiment, the plurality of power storage systems 40 are charged at the same time. Therefore, the charging process is inhibited from being concentrated in only one power storage system 40. The plurality of power storage systems 40 may be evenly charged so that the amount charged in the plurality of power storage systems 40 are equalized. The plurality of power storage systems 40 may be charged based on the amount in which each of the plurality of power storage systems 40 can be charged so that the charging process suited to each power storage system 40 is performed. The plurality of power storage systems 40 may be discharged at the same time. Therefore, the discharging process is inhibited from being concentrated in only one power storage system 40. The plurality of power storage systems 40 may be evenly discharged so that the amount discharged from the plurality of power storage systems 40 are equalized. The plurality of power storage systems 40 may be charged based on the amount in which each of the plurality of power storage systems 40 can be discharged so that the discharging process suited to each power storage system 40 is performed.

Given above is a description of the present disclosure based on exemplary embodiments. The embodiment is intended to be illustrative only and it will be understood by those skilled in the art that various modifications to constituting elements and processes could be developed and that such modifications are also within the scope of the present disclosure.

In embodiments 1, 2 described above, the priority level related to charge and the priority level related to discharge are different. Alternatively, however, the priority level related to charge and the priority level related to discharge may be equal. According to this variation, these priority levels can be set easily.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A power controller installed at a customer's site and adapted to control charge and discharge of a plurality of power storage systems connected to a power system, comprising:
   a recognition interface that recognizes a reverse flow state in which power flows from the customer's site to the power system or a forward flow state in which power flows from the power system to the customer's site; and
   a controller that, when the recognition interface recognizes a reverse flow state, causes at least one of the plurality of power storage systems to be charged, based on a priority level related to charge defined for the plurality of power storage systems, wherein
   when the recognition interface recognizes a forward flow state, the controller causes at least one of the plurality of power storage systems to be discharged, based on a priority level related to discharge defined for the plurality of power storage systems.

2. The power controller according to claim 1, wherein the priority level related to charge and the priority level related to discharge in the controller are equal.

3. The power controller according to claim 1, wherein the priority level related to charge and the priority level related to discharge in the controller are different.

4. The power controller according to claim 1, further comprising:
   a user operation interface configured to be user-controllable, wherein
   the controller causes at least one of the plurality of power storage systems to be charged, based on the priority level related to charge input from the user operation interface.

5. The power controller according to claim 1, wherein
   the recognition interface recognizes an amount in which each of the plurality of power storage systems can be charged, and
   the controller generates the priority level related to charge for each of the plurality of power storage systems such that the larger the amount in which the system can be charged as recognized by the recognition interface, the higher the priority level.

6. The power controller according to claim 1, wherein
the recognition interface recognizes an amount discharged in each of the plurality of power storage systems, and
the controller generates the priority level related to charge for each of the plurality of power storage systems such that the larger the amount discharged as recognized by the recognition interface, the higher the priority level.

7. The power controller according to claim 1, wherein
the controller generates the priority level related to charge for each of the plurality of power storage systems based on a date of installation at the customer's site.

8. The power controller according to claim 1, further comprising:
a user operation interface configured to be user-controllable, wherein
the controller causes at least one of the plurality of power storage systems to be discharged, based on the priority level related to discharge input from the user operation interface.

9. The power controller according to claim 1, wherein
the recognition interface recognizes an amount in which each of the plurality of power storage systems can be discharged, and
the controller generates the priority level related to discharge for each of the plurality of power storage systems such that the larger the amount in which the system can be discharged as recognized by the recognition interface, the higher the priority level.

10. The power controller according to claim 1, wherein
the recognition interface recognizes an amount charged in each of the plurality of power storage systems, and
the controller generates the priority level related to discharge for each of the plurality of power storage systems such that the larger the amount charged as recognized by the recognition interface, the higher the priority level.

11. The power controller according to claim 1, wherein
the controller generates the priority level related to discharge for each of the plurality of power storage systems based on a date of installation at the customer's site.

12. A power control method adapted for a power controller installed at a customer's site and adapted to control charge and discharge of a plurality of power storage systems connected to a power system, the method comprising:
recognizing a reverse flow state in which power flows from the customer's site to the power system or a forward flow state in which power flows from the power system to the customer's site;
when a reverse flow state is recognized, causing at least one of the plurality of power storage systems to be charged, based on a priority level related to charge defined for the plurality of power storage systems; and
when a forward flow state is recognized, causing at least one of the plurality of power storage systems to be discharged, based on a priority level related to discharge defined for the plurality of power storage systems.

13. A recording medium encoded with a program adapted for a power controller installed at a customer's site and adapted to control charge and discharge of a plurality of power storage systems connected to a power system, the program comprising computer-implemented modules including:
a module that recognizes a reverse flow state in which power flows from the customer's site to the power system or a forward flow state in which power flows from the power system to the customer's site;
a module that, when a reverse flow state is recognized, causes at least one of the plurality of power storage systems to be charged, based on a priority level related to charge defined for the plurality of power storage systems; and
a module that, when a forward flow state is recognized, causes at least one of the plurality of power storage systems to be discharged, based on a priority level related to discharge defined for the plurality of power storage systems.

* * * * *